Fig. 2.

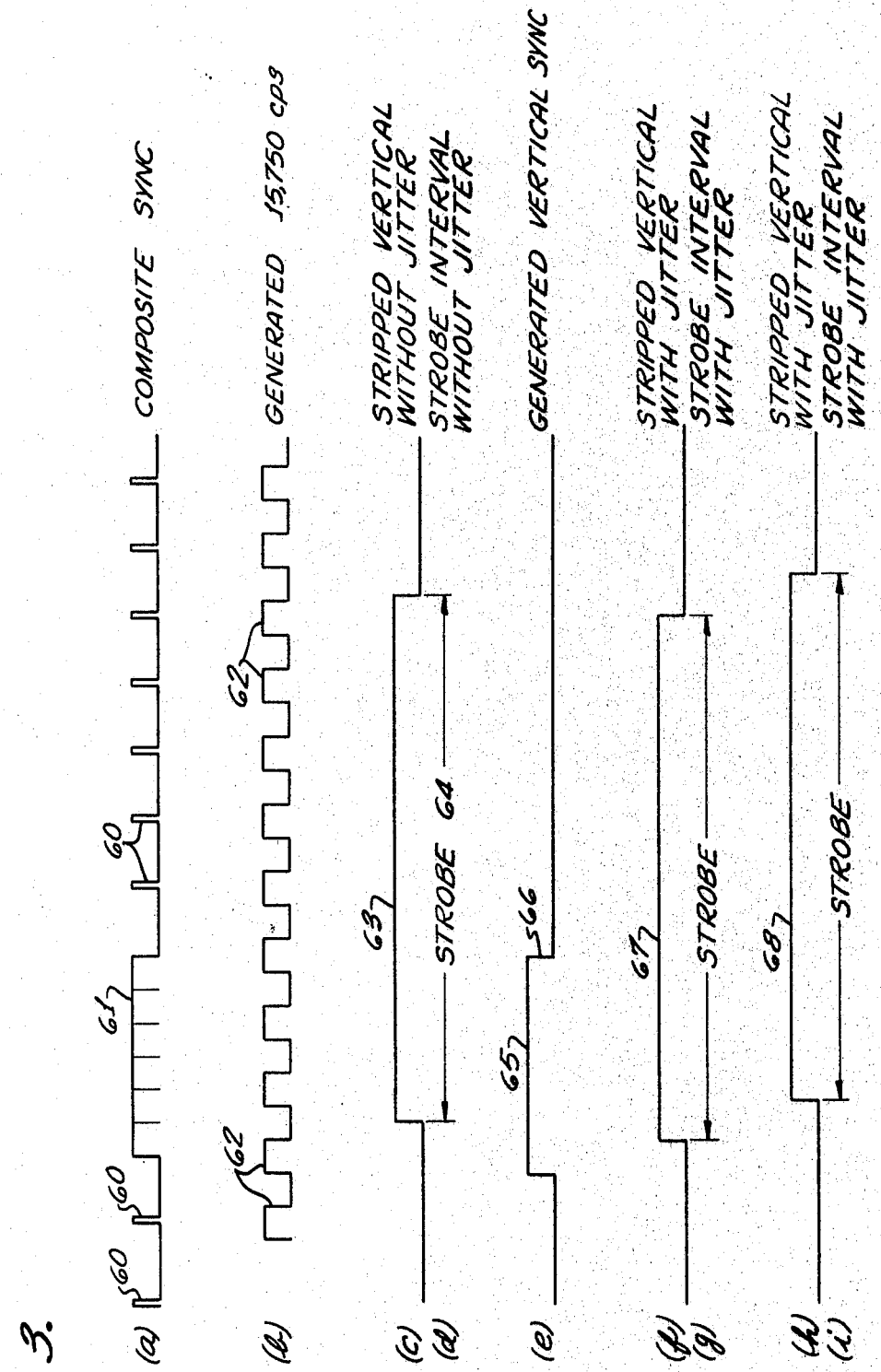

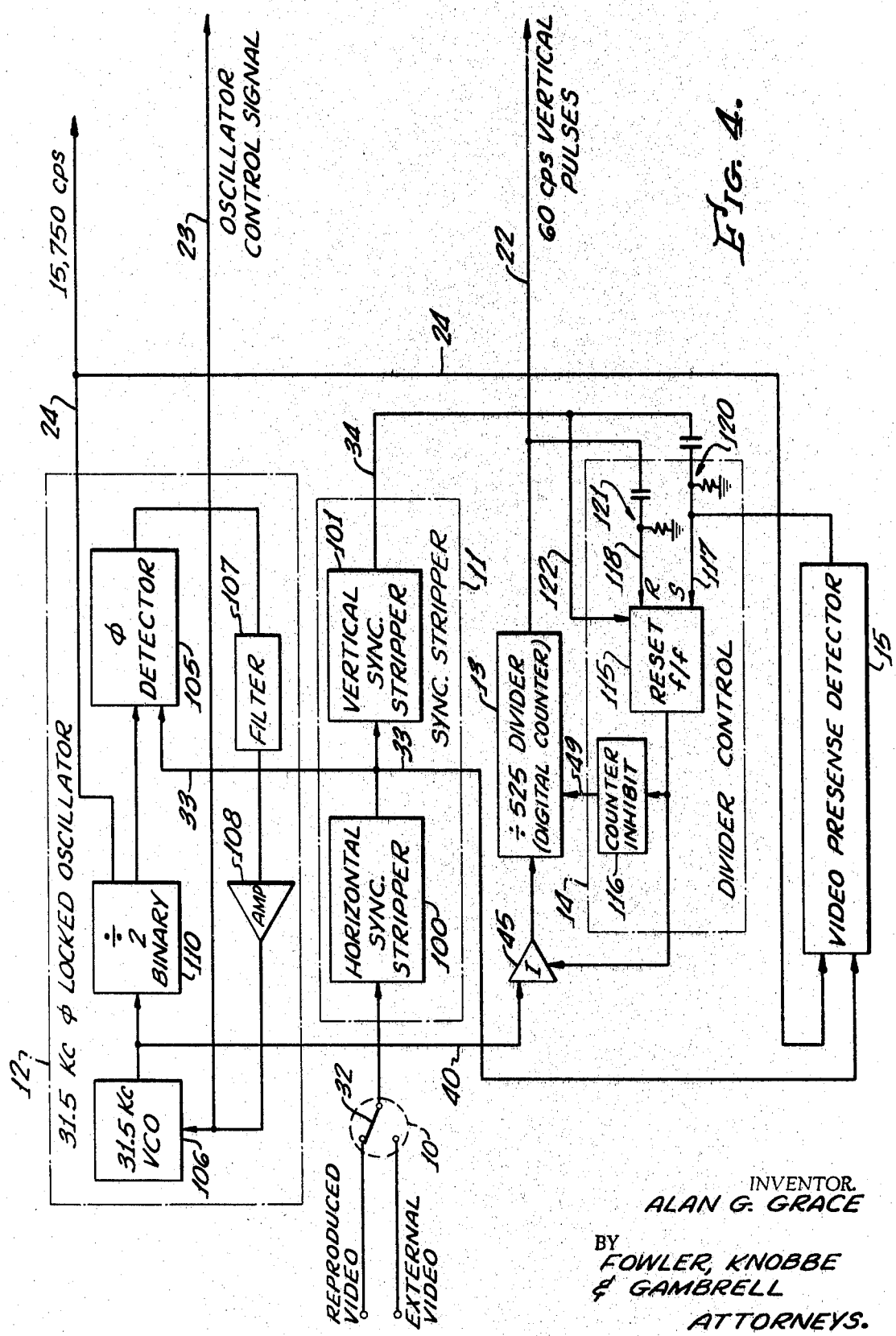

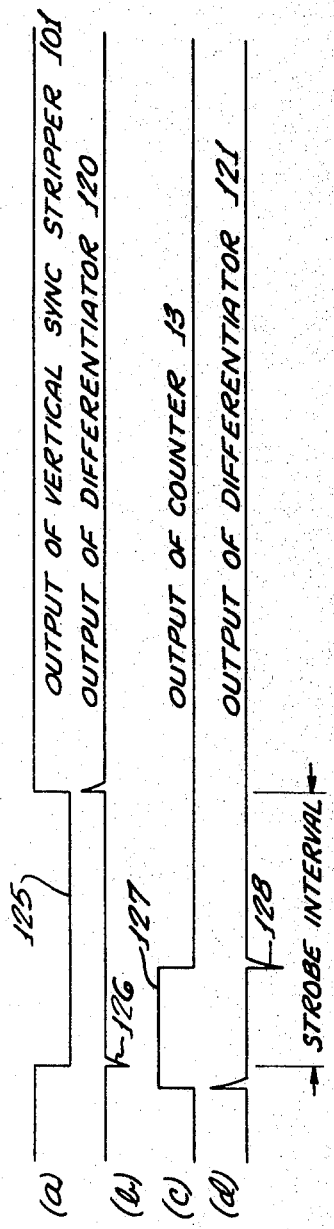
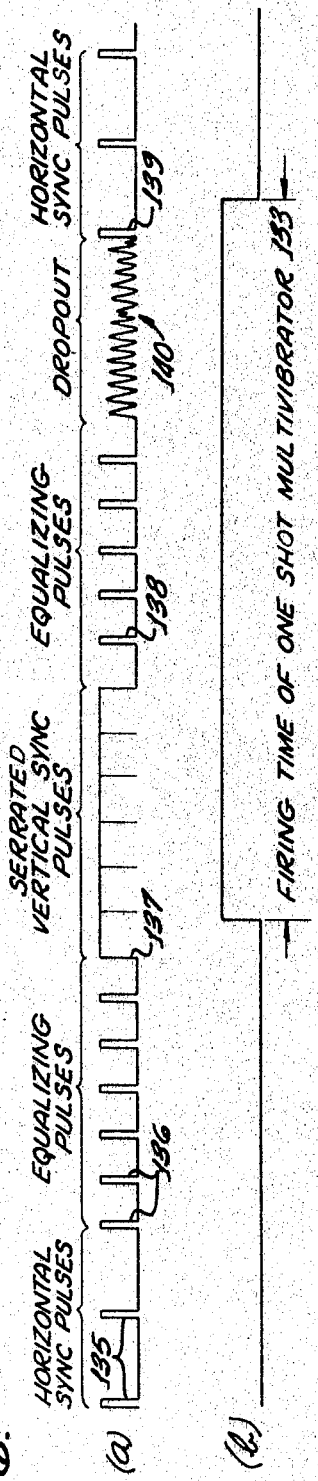
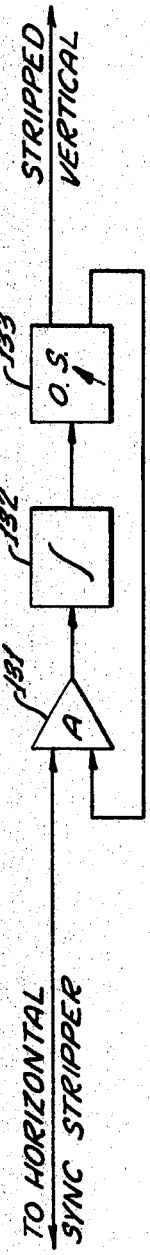

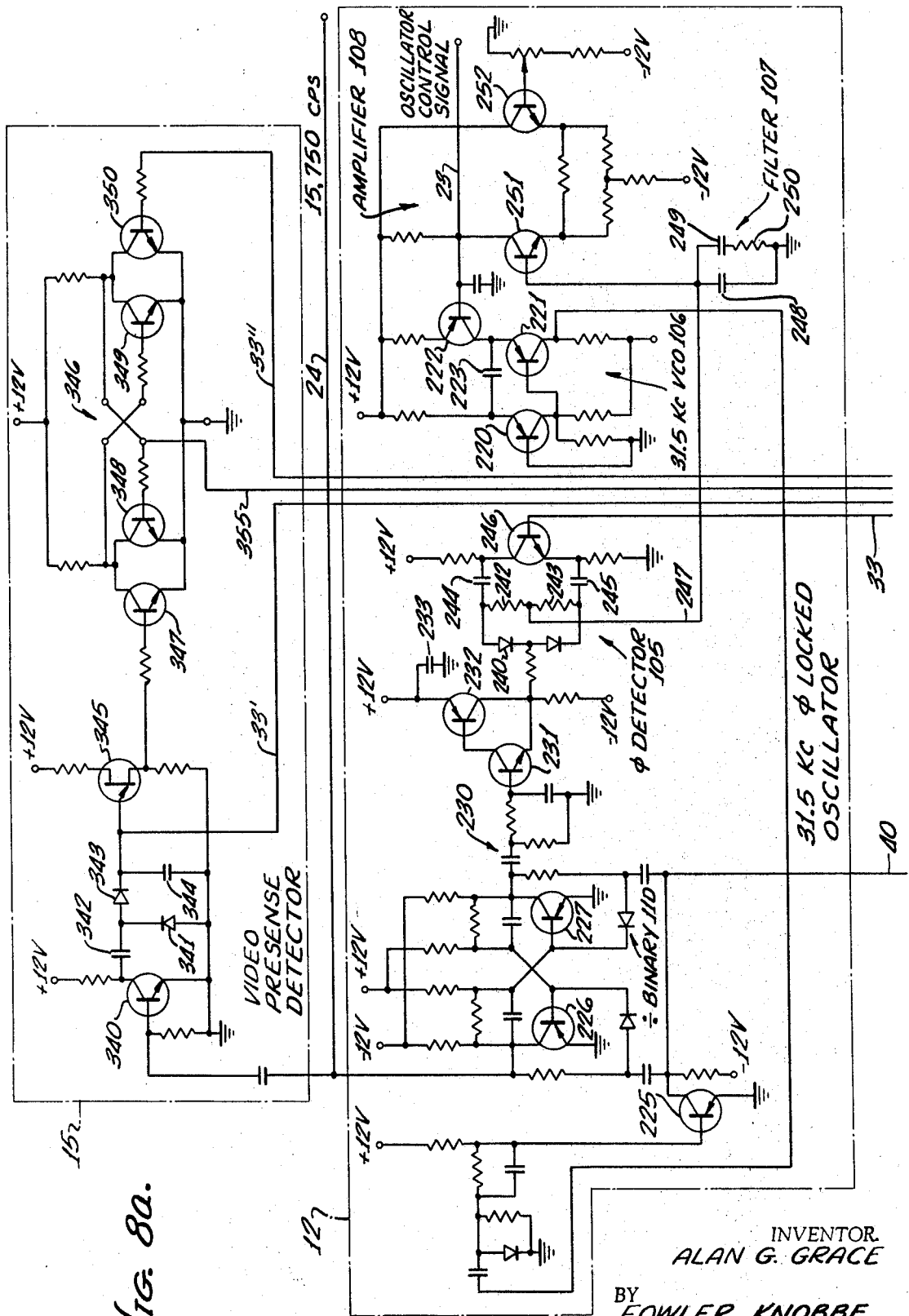

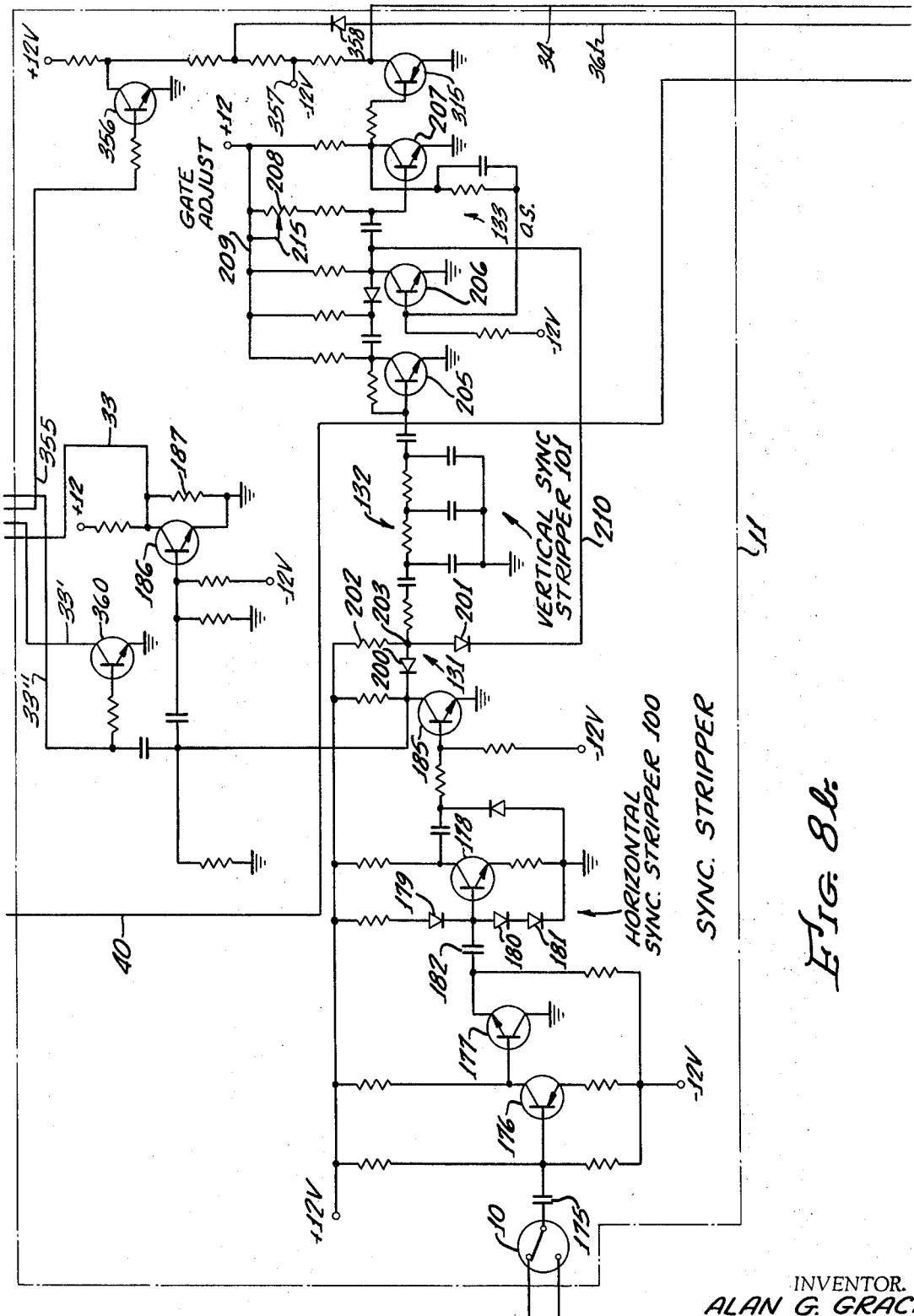

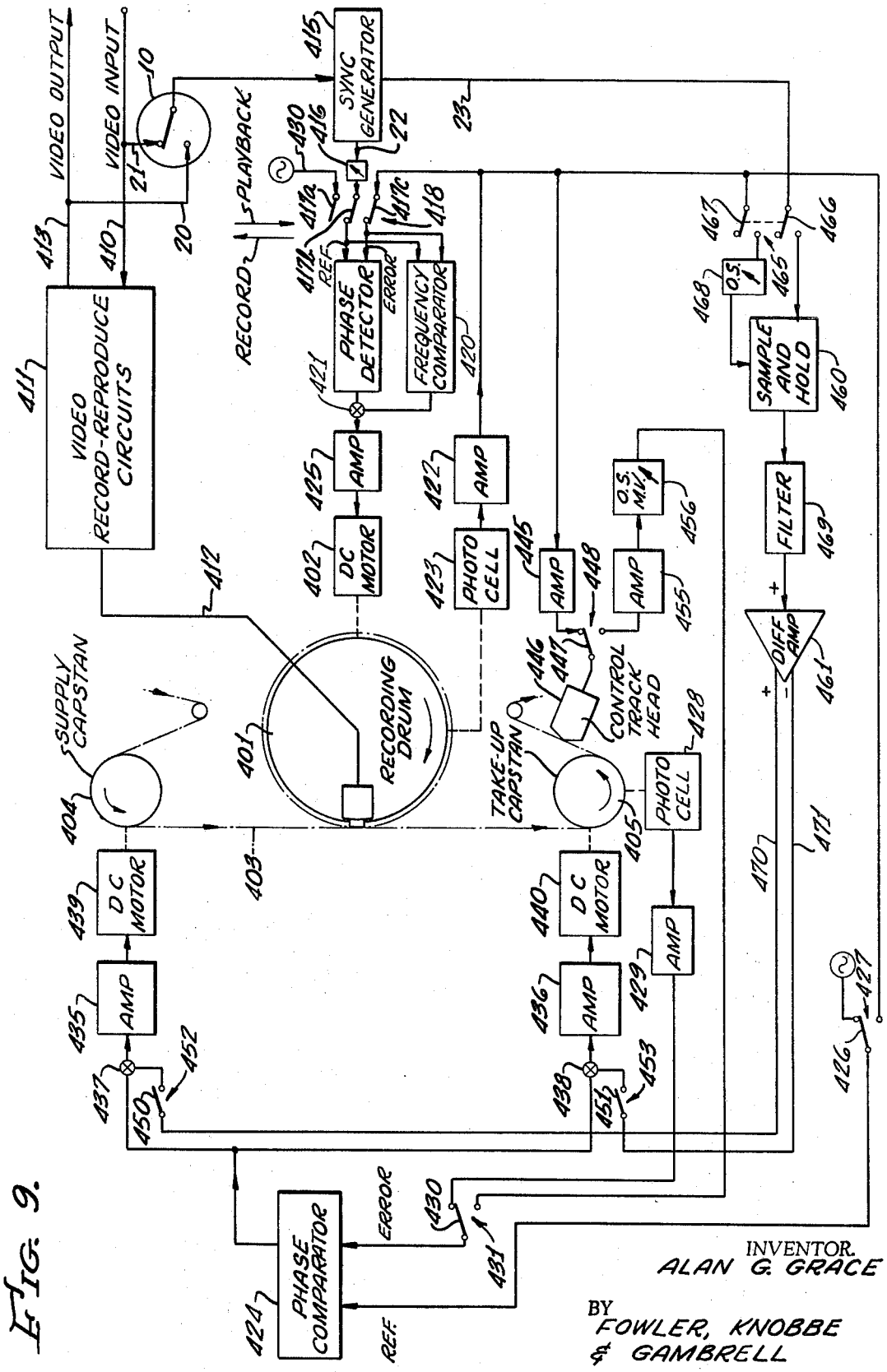

3,517,127
SYNC GENERATOR AND RECORDING SYSTEM INCLUDING SAME
Alan G. Grace, San Carlos, Calif., assignor, by mesne assignments, to Allan R. Fowler, Orange, Calif., trustee
Filed Mar. 21, 1966, Ser. No. 535,929
Int. Cl. H04n 5/04
U.S. Cl. 178—69.5                                    23 Claims

ABSTRACT OF THE DISCLOSURE

The sync generator includes a local oscillator which generates sync pulses at a frequency of 2f phase locked to horizontal sync pulses stripped from an incoming composite video waveform at a frequency f. The generated sync pulse is divided by 525 to produce a jitter-free vertical sync pluse. The generated vertical sync pulse is checked against the phase of a vertical sync pulse stripped from the composite video waveform. If the difference exceeds a predetermined limit, the division by 525 is interrupted until the next stripped vertical sync pulse at which time the division by 525 is restarted to re-establish phase agreement between the stripped and the generated vertical sync pulses.

To prevent the generated vertical sync pulse from being re-phased due to a phase difference caused by a temporary blackout of the stripped horizontal sync pulse, when such a blackout is detected, the circuitry for interrupting the division by 525 is disabled and the generation of vertical sync pulses on the basis of dividing by 525 is continued.

There is also disclosed a servo system wherein the jitter-free vertical sync pulses are used to synchronize the rotatable transducing head of a video tape recorder.

---

The present invention relates generally to an improved sync generator and particularly to a generator for producing sync pulses which are free of the jitter, noise and transients present on corresponding sync pulses separated from a composite synchronizing waveform. This invention further relates to improvements in a system for recording and reproducing frequencies within a wide frequency spectrum.

The exemplary embodiments of this invention are described for use in conjunction with television video waveforms. In this mileu, the video signal includes first and second types of sync pulses—horizontal pulses occurring at 15,750 c.p.s. and vertical pulses occurring at 60 c.p.s. respectively in the system adopted in America—respectively defining the horizontal and vertical scanning intervals in both the television transmitter and receiver. In order to use these synch pulses for synchronization purposes in, for example, a video tape recorder, these pulses must be separated from the composite video signal. When the vertical sync pulses are separated or stripped from the composite video signal, the timing of the stripped vertical pulses is affected by the presence of noise and transients in the video signal resulting in erroneous phase displacements of the vertical sync pulses, such timing errors being commonly referred to in the art as pulse jitter. When these unsteady "jittery" pulses are applied to a machine for synchronization purposes, e.g. for synchronizing a closed servo loop, timing errors will be introduced which cannot be corrected by the servo. In addition, while any given vertical sync pulse will normally have a timing error of less than some 25 microseconds, which error by itself may not be sufficiently large to produce a perturbation in the machine, the effects of jitter may be cumulative, that is, the machine may add successive ones of such timing errors resulting in a substantial synchronization error after only a few frames of video input.

Another problem associated with the utilization of the stripped horizontal and vertical sync pulses for machine synchronous purposes is that sometimes these pulses are missing during part or all of a vertical frame, i.e. during a momentary blackout of video information caused by noise, human error, a bad piece of tape in the video recorder, equipment failure, etc. If this interruption is only momentary, it may be highly disadvantageous to shut down the machine servo loop during the interruption and start it back up when the video returns.

These problems are obviated by the present invention wherein a variable frequency local oscillator produces a continuous waveform phase-locked to the stripped horizontal sync when this synchronizing signal is present and oscillating at a frequency proportional to the horizontal sync when this synchronizing signal is missing. The output of this local oscillator is digitally divided for generating a waveform having a repetition rate corresponding to the vertical sync and whose timing is precisely determined by the local oscillator and digital divider. The phase of these jitter-free sync pulses is checked with the phase of the stripped vertical pulses by a control means operatively connected to the digital divider. This control means tolerates the relative phase differences between the generated vertical sync pulses and the stripped vertical pulses due to noise, transients and jitter between the respective pulses while serving to instantaneously detect a true change in vertical sync of the input video signal resutling, for example, from switching to a different camera or TV channel. Moreover, these vertical sync pulses continue to be generated when the synchronizing waveform is missing from the composite video input signal because of the "flywheel" effect of the local oscillator which continues to oscillate if the synchronizing information is missing from the input video.

This invention further relates to systems incorporating this sync generator for improved recording and reproducing a wide frequency spectrum such as a video magnetic tape recorder. In the exemplary embodiment of this system, the local oscillator of the sync generator is phase-locked to the stripped horizontal sync pulses of the video signal which is being recorded by the system in the "record" operation and reproduced by the system in the "reproduce" operation. A servo loop including the generated vertical sync output of the sync generator precisely controls the speed and position of the magnetic recorder head without introducing timing inaccuracies due to jitter in the stripped vertical sync. Accordingly, any inaccuracies caused by jitter are eliminated and any cumulative effects therefrom are eliminated in this recorder system.

This precisely accurate servo control of the drum speed and position is particularly important with advanced magnetic tape recorder machines which are capable of holding better timing accuracies than the accuracies of the vertical sync stripped from the input video signal. An exemplary embodiment of such a machine is disclosed and claimed in the co-pending application of Alexander R. Maxey entitled "Tape Recorder," Ser. No. 536,107, filed Mar. 21, 1966, now abandoned, and co-pending application of Alexander R. Maxey entitled "Dual Capstan Control System," Ser. No. 537,222, filed Mar. 24, 1966, now abandoned.

An additional feature of the recording system of the present invention is that the head drive is maintained close to the correct frequency and phase during momentary interruptions of the input video signal. This advantage is the result of the "flywheel" effect of the local oscillator in the sync generator which continues to generate vertical sync pulses during the video blackout periods.

Other and further objects, features and advantages of the invention will become apparent by a study of the following detailed description taken in connection with the accompanying drawings in which:

FIGS. 2a through 2p illustrate representative waveforms at several points in the sync generator described herein;

FIGS. 3a through 3i show enlarged waveforms for more clearly illustrating the tolerance of the sync generator to jitter of the stripped vertical sync pulses;

FIG. 4 is a more detailed block diagram of a sync generator constructed in accordance with the invention;

FIGS. 5a through 5d illustrate waveforms at several points in the block diagram of FIG. 4 and circuit schematic of FIG. 8;

FIGS. 6a and 6b are illustrations of waveforms showing the manner in which the strobe interval is produced;

FIG. 7 is a block diagram of an improved vertical sync stripper stage;

FIGS. 8a, b and c provide a detailed schematic circuit of an exemplary embodiment of the invention;

FIG. 9 is a schematic view illustrating a system for recording and reproducing frequencies within a wide frequency spectrum.

OVERALL DESCRIPTION OF SYNC GENERATOR

Figure 1:
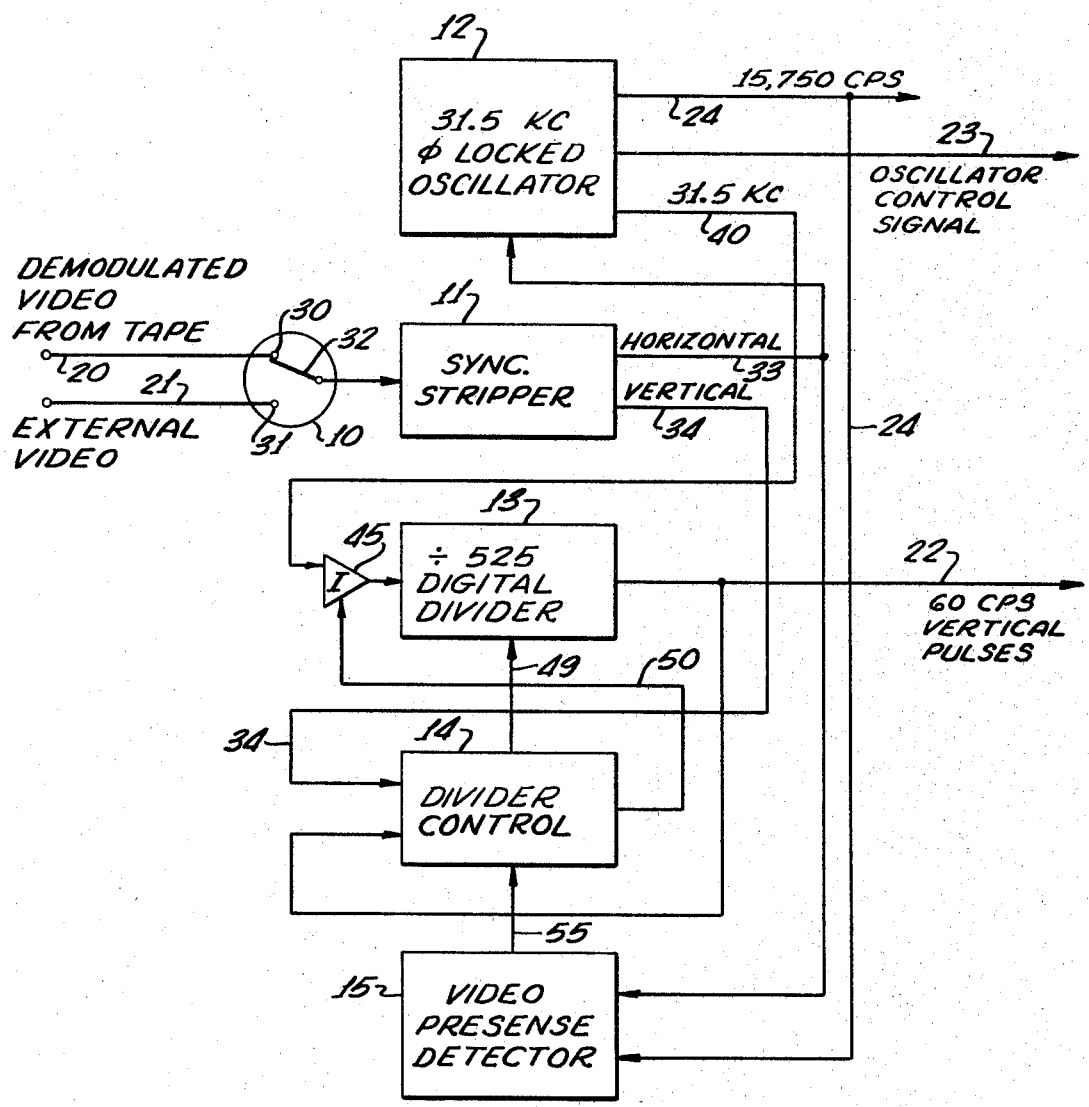
FIG. 1 is a simplified block diagram of a sync generator constructed in accordance with the invention.

Referring now to the simplified block diagram of FIG. 1, there is shown a sync generator comprised of an input switch 10, a sync separator or stripper 11, a 31.5 kc. phase-locked oscillator stage 12, a digital divider stage 13, a divider control stage 14, and a video presence detector 15. The input signals to the sync generator are introduced through the switch 10 and in the exemplary embodiment shown comprise the demodulated video from tape on input line 20 and the video from the station or camera on line 21. As described above, this sync generator is typically used in conjunction with a video tape recorder, input 20 then being connected directly to the output of the recorder demodulator so that the reproduced signal obtained during the "playback" operation is fed directly to this lead and the other input 21 being connected to the video signal which is recorded on the tape during the "record" operation.

Output signals are available from the sync generator as shown in FIG. 1, including a generated 60 c.p.s. vertical pulse sync train on output lead 22, the local oscillator control signal on output lead 23, and a generated 15,750 c.p.s. pulse train on output lead 24.

Input leads 20 and 21 are connected to respective fixed contacts 30 and 31 of single pole-double throw switch 10. The movable contact 32 of the switch is connected to the input of the sync stripper stage 11 which separates the composite sync of the video input into its horizontal pulse component on output lead 33 and its vertical pulse component on output lead 34. The horizontal pulses are connected to the input of the phase-locked oscillator stage 12.

Phase-locked oscillator stage 12 compares the phase of a variable frequency local oscillator with the horizontal pulses derived from the input video signal for phase-locking the local oscillator to the input video. In the specific embodiment disclosed herein and described in more detail below, the local oscillator is a voltage controlled oscillator having an output frequency of 31.5 kc. (15,750 when divided by two) with no control signal applied to its input and an increased or decreased frequency as determined by the magnitude and polarity of the control signal. The VCO output frequency is divided by two to proivde the 15,750 c.p.s. signal on output lead 24. The control signal for phase-locking the oscillator to the input video is provided on output lead 23. In addition, a 31.5 kc. signal derived directly from the local oscillator is applied on lead 40 to the input of counter 13 through inhibit gate 45.

Digital divider 13 digitally divides the 31.5 kc. pulses received from the local oscillator by five hundred and twenty-five and provides an output pulse on output lead 22 for every 525th input pulse. The divider then automatically resets (unless inhibited by stage 14) and again divides down by 525. Successive division cycles of five hundred and twenty-five provide a resultant train of vertical sync pulses occurring at 60 c.p.s. on the output lead 22. The digital divider stage 13 assures that the timing of the leading and trailing edge of each one of the generated vertical sync pulses is precisely synchronized with respect to the locally generated horizontal sync signal. Accordingly, these locally generated vertical sync pulses are free of the noise, transients and other factors which produce jitter of the stripped vertical. Phase correspondence between these generated vertical sync pulses and the stripped vertical sync is provided by the divider control stage 14.

The divider control stage 14 is operatively connected both to the digital divider stage 13 by lead 49 and the inhibit gate 45 by lead 50 and checks each of the locally generated vertical pulses on output 22 with the stripped vertical pulses on lead 34. Each stripped vertical pulse produces a strobe interval of predetermined selected length. As described below and illustrated in FIG. 3, the position of this strobe interval is so arranged with respect to the generated vertical sync waveform to permit a predetermined relative phase movement between the stripped vertical and generated vertical pulses and thereby tolerate the phase differences between the stripped and vertical pulses which are due to noise, transients or jitter of the stripped vertical pulses.

The divider control stage 14 determines whether or not the locally generated sync falls within or without this strobe interval. If the generated sync pulse on 22 occurs during the strobe interval, neither the inhibit gate 45 or digital divider stage 13 are affected and divider 13 resets and performs a subsequent count-down sequence. If, however, the generated sync pulse on 22 occurs before or after the strobe interval, signals are applied on both leads 49 and 50 to disable the divider 13 and close gate 45 to inhibit flow of the 31.5 kc. pulses into the divider. As a result, the pulse division in stage 13 is interrupted until occurrence of the next stripped vertical pulse on lead 34, which pulse when applied to the divider control stage 14 causes this stage to reset divider 13 to zero and open inhibit gate 45 so as to permit the 31.5 kc. pulses to flow from stage 12 to the input of divider 13. Hence, the digital divider 13 is started in synchronism with the stripped vertical pulse when an out-of-phase condition is detected by stage 14 (and when the system is initially connected to input video).

As described above, the position and length of the strobe interval is of sufficient duration that small timing variations in the stripped vertical pulses (caused, for example, by jitter, noise, transients) will be tolerated. The typical effect of jitter is that it phase displaces any given stripped vertical sync pulse some 5 to 10 microseconds with a maximum phase displacement thereof being of the order of 20 microseconds. In this way, very accurate timing is maintained for the locally generated vertical sync pulses on lead 22—giving these generated pulses substantially greater stability than the stripped vertical pulses obtained at the output of the sync stripper 11—while effectively maintaining the generated pulses in phase-lock with the vertical sync of the input video.

It will be seen that the phase-locked oscillator stage 12 provides a horizontal phase-lock on the locally generated horizontal sync pulses and the divider stage 13 and divider control stage 14 maintain vertical phase synchronization between the locally generated vertical sync pulses and the vertical sync on the input video. That portion fo the system described so far provides extremely accurate and precise sync generator for producing output pulses at both the horizontal and vertical rate so long as the 31.5 kc. local oscillator stage 12 maintains a frequency exactly twice the frequency of horizontal sync. If, however, there is a momentary interference or blackout in the input video information caused, for example, by a noise pulse or a bad piece of tape, several of the horizontal sync pulses of the input video will be lost. If a sufficient number of lines are lost, e.g. six to nine lines, the frequency of the local phase-locked oscillator stage 12 can be sufficiently changed upon interruption of the oscillator control signal that the 525th pulse applied to counter output 22 is out of phase with the stripped vertical output 34. This condition would normally cause the divider control stage to stop the digital divider stage 13 and inhibit its operation until some 16 milliseconds later when the succeeding stripped vertical pulse was received on lead 34. Video presence detector 15 is operatively connected to the divider control stage 14 for preventing a shutdown of the sync generator digital divider due to a loss in synchronizing information from the input video signal.

Video presence detector 15 has one input connected to the stripped horizontal output 33 and another input connected to the locally generated horizontal pulses on lead 24. Stage 15 compares these pulse trains for detecting a consecutive dropout of a predetermined number of horizontal pulses and provides an output inhibit signal on lead 55 when this predetermined number of horizontal pulses are absent, this signal being continuously supplied until horizontal sync is again present in the input video. Whenever this inhibit signal is present at the end of the digital division by stage 13, it prevents the divider control stage 14 from inhibiting gate 45 and disabling divider 13 so that the latter stage continues to recycle at the end of its 525th digital division for supplying the vertical sync pulse train on output lead 22.

The predetermined number of missing stripped horizontal sync pulses detected by stage 15 is that number which may cause a sufficient perturbation in the frequency of the local oscillator to change the timing of the generated vertical sync pulse on lead 22. This number will vary according to the bandwidth of the feedback loop in stage 12. In the illustrative embodiment disclosed herein, the phase lock in stage 12 is quite fast, i.e. the phase comparator servo has on the order of a 300 c.p.s. noise bandwidth loop, and the video presence detector 15 is set to detect between six and nine consecutively missing pulses. In essence, then, the video presence detector 15 provides a means for overriding the comparison between the locally generated vertical pulses and the stripped vertical pulses when the input video signal is of sufficiently poor quality so as to change the local oscillator frequency. Accordingly, the generated vertical sync pulses are compared to the vertical sync of the input video when this input signal provides good quality composite sync whereas the timing accuracy of the local oscillator and digital counter stages 12 and 13 are substituted during bad tape conditions, conditions of excessive noise, etc.

Figure 2:
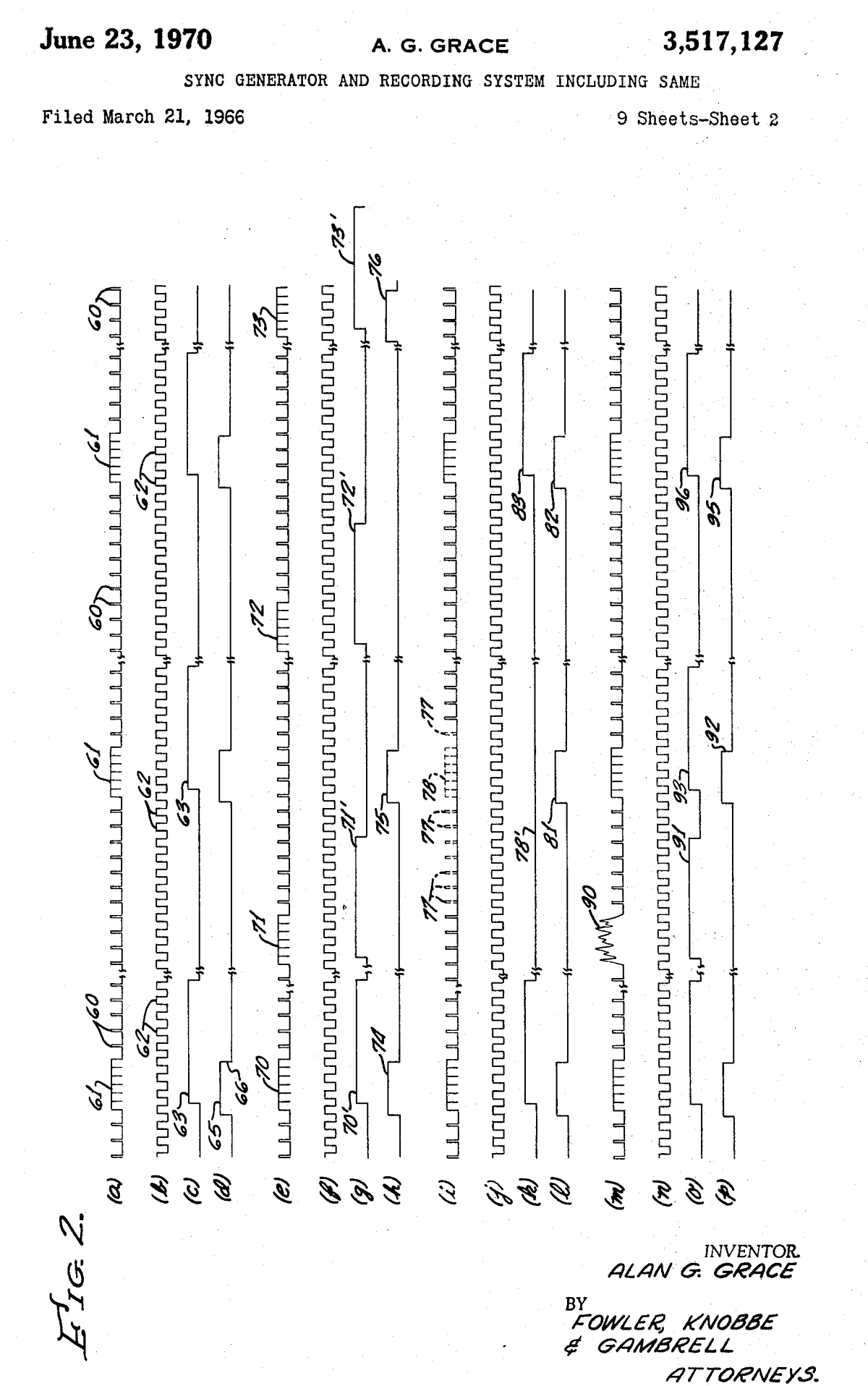

The overall operation of the sync generator may be further understood by referring to FIGS. 2 and 3 wherein are shown some typical waveforms at the input and output of the sync generator. FIG. 2a illustrates a simplified composite sync signal having a plurality of horizontal sync pulses 60 of short duration and spaced vertical sync pulses 61 of substantially longer duration broken up into six serrations. For simplicity, the equalizing pulses are not shown in this figure. In the American synchronizing system, each horizontal scanning interval is 63.5 microseconds and each of the horizontal pulses 60 have a length equal to 8±1 percent of the line horizontal-scanning period, or 5.08±0.64 microseconds and occur at a 15,750 c.p.s. rate, and the vertical pulses have a length equal to three times the line horizontal-scanning period, or 190 microseconds and occur at a 60 c.p.s. rate. The horizontal sync pulses are separated in the sync stripper 11 and directed to the phase-locked oscillator stage 12 where they are used to lock the local oscillator to produce a locally generated 15,750 c.p.s. square wave pulse train 62 as shown in FIG. 2b. In the exemplary embodiment described herein, the local oscillator is driven such that the locally generated pulses lead the stripped horizontal sync pulses by one-quarter of a line (15.8 microseconds) as shown. The sync stripper 11 also provides the stripped vertical sync pulse 63 on output lead 34, which defines the strobe interval 64, representative pulses and a representative strobe interval being shown in enlarged view in FIGS. 3a, b, c and d. In the illustrative embodiment described herein, the pulse 63 and resultant strobe interval 64 are initiated coincident with the second serration of the composite vertical sync pulse 61 and have a selectively variable duration.

As described above, the 31.5 kc. output of the phase-locked oscillator stage is divided in digital divider stage 13 to provide a 60 c.p.s. vertical pulse train 65 at output lead 22, this pulsed signal being shown in FIGS. 2d and 3e having a pulse length of the order of 200 microseconds. Since the output signal of the local oscillator is leading in phase with respect to the stripped horizontal sync, the locally generated vertical sync pulses lead the stripped vertical pulses as shown. The trailing edge 66 of each generated vertical sync pulse is compared at the counter control stage 14 with the strobe interval 64, no inhibit being applied so long as the trailing edge 66 occurs sometime during the strobe interval.

FIG. 3 illustrates in expanded scale the effect of jitter on the timing of the stripped vertical pulse. FIG. 3a illustrates a small portion of the composite sync including the horizontal pulses 60 and serrated vertical pulse 61; FIG. 3b illustrates a small portion of the generated horizontal sync 62; FIG. 3c illustrates a single stripped vertical pulse 63 with no jitter present; FIG. 3d illustrates the strobe interval 64 with no jitter and FIG. 3e illustrates the locally generated vertical sync pulse 65. FIGS. 3f and 3h illustrate the phase shift in the stripped vertical pulses 67, 68 resulting from substantial jitter, e.g. of the order of 20 microseconds. If such pulses were used as the vertical synchronizing signal for synchronizing a fast response servo loop, the servo would attempt to follow the phase shift of each such pulse, e.g. slowing down momentarily to follow the slightly lagging pulse 68 and then be required to speed up again when the next properly phased vertical sync was applied. Moreover, the effects of jitter may be cumulative, that is, the servo loop may add successive jitter errors, resulting in a much larger synchronization error than the error caused by any one stripped vertical pulse being out of phase because of jitter. These erroneous fluctuations caused by jitter, noise, etc. on the stripped vertical sync are eliminated by this invention since, as shown, the timing of generated vertical sync pulse 65 of FIG. 3e is governed by a precise digital division of the local oscillator frequency and is so maintained as long as the trailing edge 66 falls during the strobe interval. As shown in FIG. 3, there is ample tolerance for even substantial jitter as the trailing edge 66 occurs well within the strobe intervals of FIGS. 3g and 3i which are each shown displaced in phase some 20 microseconds by reason of the jitter of the stripped vertical sync pulses 67 and 68.

Returning now to FIG. 2, FIGS. 2e to 2h illustrate the operation of the sync generator when the phase of the stripped vertical sync pulses suddenly changes—when, for example, the input video is switched from one camera to another camera some 300 to 400 microseconds apart in vertical sync. This is shown in the composite sync waveform of FIG. 2e wherein a first vertical sync pulse 70 is followed shortly thereafter by a second vertical sync pulse 71, pulse 71 initiating a new vertical sweep interval defined by subsequent vertical pulses 72 and 73. The output phase of the generated horizontal sync pulses on output lead 24 and the 31.5 kc. signal on lead 40 will quickly lock in phase with the new video source to produce a phase-locked horizontal pulse train shown in FIG. 2f. However, the stripped vertical waveform will be as shown in FIG. 2g, wherein pulses 70', 71', 72' and 73' correspond to the vertical pulse of the composite sync signal. The operation of the sync generator as described herein is to produce a first pulse 74 corresponding in time to the stripped vertical pulse 70' and 256 lines later a subsequent pulse 75, as generated at the output of the divider stage 13. However, the position of pulse 75 does not correspond to the strobe interval defined by stripped vertical wave form 71', and, as a result, the divider stage 13 is disabled until the occurrence of the following stripped vertical pulse 72'. At this time, gate 45 is again opened and the divider reset to immediately commence dividing down the 31.5 kc. output of the local oscillator to produce a pulse 76 corresponding in time with the strobe interval defined by the stripped vertical pulse 73'.

FIGS. 2i to 2l illustrate the tolerance of the sync generator to a loss of sync pulses in the input video signal. Thus, FIG. 2i illustrates a fairly substantial blackout in sync information in the input video signal, the missing sync pulses including a series of seven horizontal pulses 77, vertical pulse 78 and a succeeding horizontal pulse 77 (the missing pulses being represented by dashed lines). The outputs of the phase-locked oscillator stage 12 may shift in phase because of a change in local oscillator frequency following the loss in horizontal sync information; however, the oscillator will continue to oscillate at its center frequency of 31.5 kc. and supply this 31.5 kc. output on lead 40 and 15,750 c.p.s. pulse train on lead 24 as shown in FIG. 2j. Also, the stripped vertical in FIG. 2k is missing an entire vertical pulse at 78' because of the missing vertical pulse 78 in the input video signal. Without the video presence detector 15, the divider control stage would sense this loss and disable the digital divider 13 for an entire vertical sweep period, resulting in the loss of a generated vertical sync pulse at 82. Instead, however, in the system of FIG. 1, the video presence detector 15 detects the loss of the horizontal pulses 77 and prevents the divider control stage 14 from disabling the divider 13. Accordingly, the inhibit gate 45 remains open following the vertical pulse output 81 at the output of divider stage 13 and the divider 13 continues to receive input pulses from the phase-locked oscillator stage 12, producing a succeeding vertical pulse 82 in phase correspondence with the stripped vertical pulse 83.

FIGS. 2m to 2p illustrate the manner in which the sync generator is resistant to even substantial noise and transients occurring in the input video signal. Thus, the composite sync signal in FIG. 2m is shown including a noise pulse 90, which, when passed through the sync stripper stage 11, reproduces as a vertical sync pulse 91. This erroneous stripped vertical pulse 91 will be entirely disregarded since it occurs at a time that the digital divider 13 is dividing the input pulses from the phase-locked stage 12. So long as the divider output coincides with the strobe interval defined by the stripped vertical pulse, the divider will continue to generate vertical sync pulses. Thus, the divider output pulse 92 properly falls in phase with the strobe interval as determined by the stripped vertical sync pulse 93 of the input video signal. As a result, the divider is reset after the 525th count and again resumes a digital division, producing the subsequent vertical sync pulse 95 in phase correspondence with the stripped vertical pulse 96.

MORE DETAILED DESCRIPTION OF SYNC GENERATOR

FIG. 4 provides a more detailed block diagram of the sync generator. As shown, the sync stripper stage 11 includes first a horizontal sync stripper 100 having its input connected to the movable contact 32 of switch 10 and its output connected to the input of the vertical sync stripper stage 101. The output of the horizontal sync stripper 100 is applied to one input of a phase detector 105 via lead 33.

Phase detector 105 is incorporated in the feedback loop forming the phase-locked oscillator stage 12. Thus, as shown, the output signal derived from the phase detector 105 is connected to the input of a voltage controlled oscillator (VCO) 106 via a stabilizing filter 107 and an amplifier 108. The output of the voltage controlled oscillator is coupled to a frequency divider stage 110 which in turn is connected to the other input of the phase detector 105. The frequency of oscillator 106 is selected to be a whole integer multiple of the repetition frequencies of both types of input pulses on the composite sync waveform. In television, these two pulses are the horizontal and vertical pulses occurring at 15,750 c.p.s. and 60 c.p.s., respectively, and the lowest frequency for oscillator 106, i.e. the lowest whole integer multiple thereof, is 31.5 kc. which is used in the illustrative embodiment herein described. Frequency divider 110 is then a divide-by-two stage and divider 13 is a divide-by-five hundred and twenty-five stage.

It will be seen that stages 105, 106, 107, 108 and 110 form a phase-locked loop in which a 15,750 c.p.s. signal is derived from the VCO output and phase compared with the 15,750 c.p.s. stripped horizontal pulses. The output error signal from the phase detector is filtered and amplified to modify the frequency of the local oscillator 106 up or down to phase lock this oscillator with the stripped horizontal sync pulses. The control signal at the output of amplifier 108 is connected to the output lead 23 to provide the oscillator control signal. The output of the divide-by-two binary stage 110 is connected to output lead 24 to provide the 15,750 c.p.s. output. The output of the 31.5 kc. VCO is connected to the input of inhibit gate 45 via conductor 40 to provide the input pulse train to the divider stage 13 for providing the 60 c.p.s. output vertical pulses on lead 22.

Divider stage 13 advantageously comprises a digital preset counter stage which provides an output for every 525th pulse applied to its input.

The divider control stage 14 comprises a reset flip-flop stage 115 and counter inhibit stage 116. Reset flip-flop 115 includes a "set" input 117 and a "reset" input 118. Set input 117 is connected to the stripped vertical sync pulses on lead 34 via a differentiating network 120. The reset input 118 is connected to the output lead 22 of counter 13 via differentiating network 121. The vertical sync pulses are also applied to input 122 of the reset flip-flop, this input being coupled to the reset side of the flip-flop for inhibiting reset of the flip-flop during the strobe interval (as defined by each stripped vertical sync pulse). The output of the reset flip-flop 115 is connected to one input of the inhibit gate 45 and to the input of counter inhibit stage 116. The output of the counter inhibit stage 116 is connected to the counter stage 13 by lead 49.

Referring to FIGS. 4 and 5, the operation of the divider control stage is as follows: the stripped vertical sync pulse 125 is differentiated in stage 120 and the pulse 126 resulting from the leading edge of the stripped vertical is used for triggering the reset flip-flop to its set state. In the "set" state, no inhibit signals are applied to either gate 45 or counter inhibit stage 116; accordingly, gate 45 is open and pulses are transmitted therethrough from the VCO 106 to the input of the then enabled counter 13. At the 525th count as registered in counter stage 13, an output pulse 127 is applied to lead 22 which is differentiated in differentiator 121. The pulse 128 resulting from the trailing edge of the generated vertical sync will reset the flip-flop unless it coincides in time with the strobe interval. In FIG. 6, the pulse 128 is shown falling within the strobe interval. If, however, the pulse 128 falls before or after the strobe interval, a control signal is then applied to both the control stage 145 and counter stage 116 for closing the gate 45 to incoming pulses from the VCO 106 and for disabling the counter stage 13. Reset flip-flop 115 will maintain the gate 45 and counter 13 in this inhibited condition until occurrence of the next succeeding stripped vertical pulse on lead 34, at which time the reset flip-flop is again put in its "set" state so as to open gate 45 and enable counter 13.

The video presence detector stage 15 compares the 15,750 c.p.s. output of the divide-by-two binary stage 110 on lead 24 with the stripped horizontal sync pulses on lead 33. If a predetermined number of stripped horizontal sync pulses are missing in the stripped horizontal pulse, the video presence detector 15 inhibits the divider control stage 14 by applying a continuous voltage level to the set input 117 of reset flip-flop 115. This voltage maintains the flip-flop in its "set" state, thereby preventing the flip-flop from being reset by the brief differentiated pulse which is applied to the reset input 118 from the output of the counter 13. In this manner, the counter stage 13 is permitted to continue receiving the pulses from the local VCO 106 for supplying the 60 c.p.s. vertical sync pulses on output lead 22 during periods of missing composite sync waveform.

GATED VERTICAL SYNC STRIPPER

A gated vertical sync stripper stage is shown in block diagram form in FIG. 7. The composite video signal, which remains after the horizontal sync pulses are separated in the horizontal sync stripper, is connected to one input of AND gate 131. The output of gate 131 is connected to the input of an integrator stage 132 whose output is connected to the input of a one-shot multivibrator 133. The stripped vertical pulses are taken from the output of the one-shot multivibrator 133. In addition, this output is connected to another input of AND gate 13. In this manner, the AND gate inhibits any further composite sync from going into the integrator 132 until the inhibit period set by the one-shot multivibrator has terminated.

The inhibit action provided by the one-shot multivibrator 133 and AND gate 132 is for the purpose of inhibiting the application of erroneous information to the input of integrator 132. Thus, FIG. 6a illustrates the composite sync upon reproduction from a recording on a drum type magnetic tape recorder having a single record-reproduce head. The horizontal sync pulses 139, equalizing pulses 138, serrated vertical sync pulse 137, and equalizing pulses 138 correspond with the American standard. The time period devoted to the equalizing pulses and serrated vertical sync pulse and several of the horizontal pulses 139 immediately following the equalizing pulses 138 is referred to as the vertical blanking interval since no picture signal is present during this period. At some time during this vertical blanking interval, there may be a dropout in information caused, for example, by a single recording head leaving the tape. In FIG. 6a, this dropout 145 is shown as occurring after the equalizing pulses 136 and occupying two lines of horizontal sync. During this dropout period, the noise on the video channel would have an adverse effect on the integrator 132. For example, this noise would tend to give an initial value to the integrator so that the firing of the vertical pulse would be upset one frame later. The action of the AND gate 131 prevents any of the noise pulses during the dropout from being applied to the integrator.

As shown in FIG. 6b, the multivibrator is fired after the first serration of the vertical sync pulse, and remains fired for some eight horizontal line periods, i.e. until after the end of the dropout period. Advantageously, the one-shot multivibrator 133 provides a selectively variable firing interval so that the length of the firing time of this multivibrator may be set to correspond with the actual position of the dropout during the vertical blanking interval, e.g. if the dropout interval is moved to the left in FIG. 6a, the firing time of the one-shot multivibrator 133 could be correspondingly shortened.

Although the input to the integrator is disconnected during the dropout period, it will be seen that any noise and transients on the video will be applied to the input integrator between vertical blanking intervals and tend to produce jitter of the stripped vertical. The deleterious effects of this jitter are obviated by the sync generator of the present invention in the manner described above.

DETAILED DESCRIPTION OF THE SYNC GENERATOR

Figure 8C:
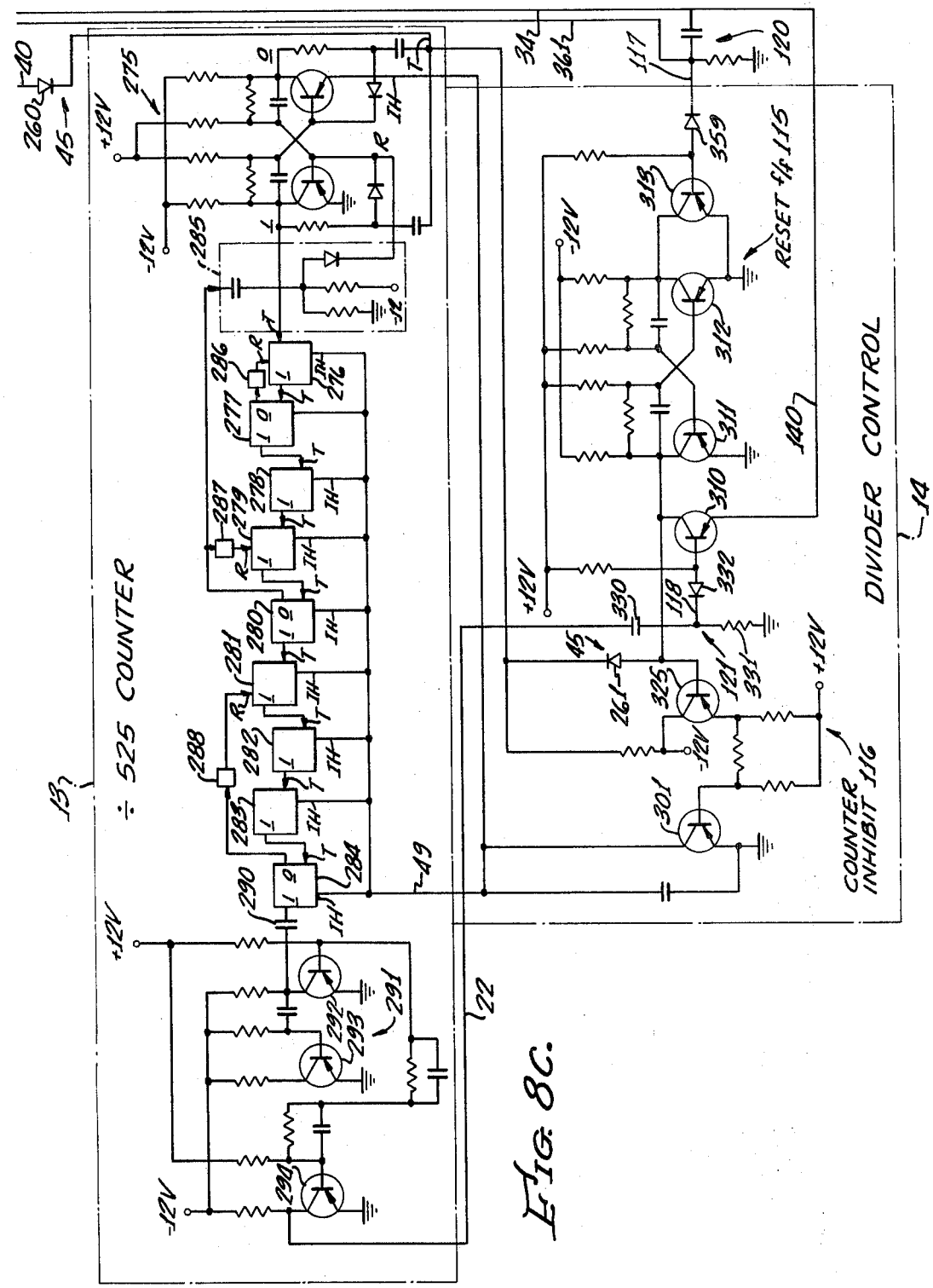

A detailed circuit schematic of an exemplary embodiment of the sync generator of this invention is shown in FIGS. 8a, b and c. A complete schematic may be assembled by placing these figures in a vertical column with FIG. 8a at the top, FIG. 8b in the middle and FIG. 8c at the bottom.

Horizontal sync stripper 100.—Referring to FIG. 8b, the incoming video from the switch 10 is supplied through coupling capacitor 175 to the base of transistor 176. This transistor stage inverts the video signal, resulting in the horizontal and vertical sync pulses going positive at the collector of transistor 176. These positive going pulses are clamped by transistor stage 177 and applied to a clipper stage comprising transistor 178, diodes 179, 180 and 181 and capacitor 182. The positive sync pulses will draw current through transistor 178 whereas the negative pulses will be cut off. Accordingly, only the composite sync signal appears at the collector of transistor 178. This signal is fed through an inverter stage comprising transistor 185 and appears as a series of positive going pulses at the collector of this transistor including every horizontal sync pulse plus the line sync information included in the equalizing pulses and the vertical serrations so that the phase detector 105 is supplied with horizontal sync information during the vertical blanking interval up to and immediately following the dropout shown in FIG. 6.

The collector of transistor 185 is also coupled to the base of transistor 186. In the intervals between the positive going stripped horizontal sync pulses, transistor 186 is OFF and its collector is clamped at a positive level. The collector load includes resistor 187 to provide a balanced drive for the phase detector stage 105 via lead 33 connected to the collector of transistor 186. When the horizontal sync pulse occurs, transistor 186 is driven ON and saturates so that the potential on its collector goes virtually to ground potential.

Vertical sync stripper 101.—The output of the horizontal sync stripper at the collector of transistor 185 is applied to the input of the vertical sync stripper 101. Reference is also made to the block diagram of this circuit of FIG. 7 and described hereinabove. AND gate 131 comprises a pair of diodes 200, 201 whose anodes are respectively connected together through resistor 202 to a positive voltage supply. The cathode of diode 200 is connected to the collector of transistor 185 and the cathode of diode 201 is connected to the one-shot multivibrator 133. The output of the AND gate appears at the common junction 203 of the diodes and is connected to the input of the integrator 162 which comprises cascaded RC sections as shown. The time constant of each RC section is such that when the combined sync waveform is applied to the integrator, there is a negligible response to the very short horizontal and equalizing pulses but a cumulative charging of the capacitor upon application of the vertical sync pulse. The pulse which appears at the output of the integrator as the result of a vertical sync pulse being applied to its input is amplified by transistor 205, whose collector is connected to the input of a one-shot multivibrator 133 comprising transistors 206 and 207. Normally, transistor 207 is ON since its base is connected through potentiometer resistance 208 to the positive bus 209. Transistor 206 is thus normally OFF so that the lead 210 connecting the collector of transistor 206 to the cathode of diode 201 is normally positively biased from the bus 209. Accordingly, the AND gate 161 is open and pulses may freely pass from the collector output of the transistor 185 of the horizontal sync stripper to the input of the integrator 162. When the vertical pulse occurs, transistor 206 is driven ON and the transistor 207 is driven OFF. When transistor 206 is driven ON, AND gate diode 201 through lead 210 is virtually clamped to ground potential, thus inhibiting any further composite sync pulses from getting through the AND gate to the input of the integrator 162. This inhibit period will continue until the firing cycle of the one-shot multivibrator 133 is completed and transistor 208 again goes ON and transistor 207 turns OFF. The firing time of the multivibrator 133 (see FIG. 6b) is adjusted by variable contact 215 engaging the potentiometer resistance 208. As described above, the time is set so that the dropout in the video information occurs before the completion of the firing cycle of the one-shot multivibrator.

Phase-Locked Oscillator 12–VCO 106.—The phase-locked oscillator stage is shown in FIG. 8a. The 31.5 kc. voltage controlled oscillator 106 comprises transistors 220 and 221 and capacitor 223 connected as an emitter coupled multivibrator. Transistors 220 and 221 provide a pair of current paths for charging capacitor 223. Transistor 222 is located in series with one of these legs to vary the current flow therethrough and thus vary the frequency of the oscillator according to the control current applied to its base. The component values are selected to provide an oscillation frequency of 31.5 kc. with no input applied to transistor 222. The oscillator output is taken off the collector of transistor 221 and applied through transistor stage 225 to the input of the divide-by-two binary 110 and the input of gate 45 via lead 40.

Divide-by-two binary 110.—The divide-by-two binary stage 110 comprises transistors 226 and 227 connected as a binary flip-flop. Since the local oscillator stage 106 is in continuous operation, the 15,750 c.p.s. output of the divide-by-two binary 110 is also continuous and the collector of transistor 226 supplies output lead 24 and the video presence detector stage 15 with the 15,750 c.p.s. square wave pulse train. The opposite side of the binary, i.e. the collector of transistor 227, supplies a 15,750 c.p.s. square wave pulse train to the input of phase detector stage 105.

Phase detector 105.—The output of the divide-by-two binary 110 is integrated in integrator stage 230 and the integrated output applied to a sweep generator comprising transistors 231 and 232 and capacitor 233. The resultant waveform at the collector of transistor 232 is a saw tooth having a positive going ramp and a negative going ramp for every cycle of the divide-by-two binary. This saw tooth waveform is applied to the phase comparator.

The phase comparator comprises the two diodes 240 and 241, resistors 242 and 243, capacitors 244 and 245 and transistor 246. The common junction of the diodes is coupled to the saw tooth waveform at the collector of transistor 232. The stripped horizontal pulses are applied to the phase comparator via lead 33 to the base of transistor 246. As described hereinabove, the lead 33 is clamped at a positive level by transistor 106 of the horizontal sync stripper so that the transistor 246 is drawing current during the intervals between the stripped horizontal pulses. When a horizontal pulse occurs, lead 33 goes virtually to ground potential and transistor 246 will go off, resulting in a positive pulse at the collector of transistor 246 and a negative pulse at the emitter of transistor 246 so that both of the diodes 240 and 241 will tend to be turned ON for sampling the integrated saw tooth waveform during the interval of the stripped horizontal sync pulse. When the loop is in phase-lock, the positive going ramp is sampled at its midpoint, thereby maintaining the generated 15,750 c.p.s. waveform leading the stripped horizontal waveform by one-quarter of a line. The output voltage of the phase detector is taken on lead 247 from the common junction of the two resistors 242 and 243 across the diodes 240 and 241 and coupled to the input of the filter stage 107. Since the phase comparator is supplied with stripped horizontal sync information during the vertical blanking interval up to and immediately following the dropout interval, a control signal on lead 23 is produced during the vertical blanking interval for maintaining the oscillator 106 in phase-lock during this interval.

Filter 107 and amplifier 108.—Filter 107 comprises capacitor 248 connected to ground in shunt with a series connected capacitor 249 and resistor 250 and is included for maintaining stable the closed-loop of the phase-locked oscillator stage 12. Transistors 251 and 252 comprise a differential amplifier stage 108 with the output being taken from the collector of transistor 251 and applied as the oscillator control signal to the base of transistor 222 for varying the oscillator frequency of the 31.5 kc. VCO stage 106. The output of the control signal differential amplifier on lead 23 is zero potential when the output of the frequency divider binary is in phase with the stripped horizontal sync pulses and a positive or negative signal according to an out of phase condition. When no stripped horizontal sync pulses are present on lead 33, the output of the differential amplifier is also zero potential and the local oscillator 106 maintains its oscillation frequency of 31.5 kc. As a result, the phase of the output of the divide-by-two binary 110 is compared with the timing of the stripped horizontal sync pulses when the latter are present to phase-lock the voltage controlled oscillator 106. When these pulses are missing, the local oscillator provides a "fly wheel" effect and continues to oscillate at twice the nominal horizontal sweep frequency.

Advantageously, the values of the components of filter 107 and the gain of amplifier 108 are selected to provide a tight feedback servo loop, e.g. of the order of a 300 c.p.s. noise bandwidth loop.

Inhibit gate 45.—Referring to FIG. 8c, the inhibit gate 45 comprises diodes 260 and 261. The cathodes of each of these diodes are connected together to the input of the digital counter stage 13. The anode of diode 260 is connected to the 31.5 kc. output of the local voltage controlled oscillator stage 106 appearing at the output of output stage 225 on lead 40 (FIG. 8a). The anode of diode 261 is connected to an output of the reset flip-flop stage 115. As described below, when this flip-flop is in the "reset" state, the anode of diode 261 is grounded, thereby inhibiting the flow of 31.5 kc. pulses through diode 260 to the input of the counter 13.

÷525 Counter 13.—The digital counter for dividing down the VCO output exactly by 525 is shown in FIG. 8c. This counter comprises a series of binary stages 275, 276, 277, 278, 279, 280, 281, 282, 283 and 284 and diode coupling stages 285, 286, 287 and 288. Each of the binary stages may be identical with the schematic shown for binary stage 275. Likewise, each binary includes a trigger input terminal T, output terminals 1 and 0, and an inhibit terminal IH. In addition, certain ones of the binaries have a reset input R. The input 31.5 kc. pulses are applied from the output of the inhibit gate 45 to the trigger input terminal T of counter binary 275. The output terminal 1 of this binary is connected to the trigger input terminal T of the succeeding binary 276. Binaries 275 to 280 are serially connected as shown with the 0 output of the sixth binary stage 280 being connected via diode coupling stage 285 back to the reset input R of binary 275 and also to the reset input of the fifth binary stage 279 via the diode coupling stage 287. An additional feedback network is provided between the 0 output of the third binary stage 277 to the reset input of the second binary stage 276 via diode coupling network 286. In this manner, the first six binary stages 275 to 280 provide for an overall countdown by thirty-five. The seventh, eighth, ninth and tenth stages 281, 282, 283 and 284 are serially connected with a feedback loop connected between the 0 output of stage 284 to the reset input of stage 281 via coupling stage 288 to provide for an overall countdown by 15. The resultant overall countdown provided by the ten binary stages is therefore the desired 525.

The 525th count is taken from the 1 output of stage 284 through coupling capacitor 290 to the input of a one-shot multivibrator 291 comprising transistors 292 and 293. The output of the one-shot is connected through an inverting stage including transistor 294 to the output lead 22. The firing time of the one-shot multivibrator determines the period of the generated vertical sync pulse. Typically, this stage produces a 200 microsecond pulse length, as shown in FIG. 6c as pulse 127.

As noted above, each of the counter binaries have an inhibit input IH. Each of these inhibit inputs is connected to a common inhibit lead 49 connected to the output of the counter inhibit stage 116 which includes transistor 301. Unless this transistor is ON, thereby grounding the inhibit line 49, none of these binaries can count. Also, when transistor 301 is turned ON, it insures that the count in each of the counter binaries is such as to provide a zero count in the counter 13 at the start of a counting sequence.

Counter inhibit stage 14.—As described above in connection with FIG. 4, the divider control stage 14 includes reset flip-flop 115, one-shot multivibrator 119 and counter inhibit 116. The circuitry for each of these stages is described below.

Reset flip-flop 115.—Reset flip-flop 115 comprises transistors 310, 311, 312 and 313 so connected that in the binary zero or "reset" state, transistor 310 is ON and transistor 313 is OFF, and in the binary one or "set" state, transistor 310 is OFF and transistor 313 is ON. The "set" input 117 is connected to the RC differentiating network 120. Referring to FIG. 5, the negative going spike caused by the leading edge of the stripped vertical sync pulse at the output of inverter stage 315 is passed by diode 359 to the base of transistor 313, causing this transistor to conduct and thus trigger the flip-flop 115 to its binary one or "set" state. In this state, the inhibit gate 45 is open since the anode of gate diode 261 is negatively biased by OFF transistor 310, whose collector is connected thereto. As a result, the 31.5 kc. pulses from the local oscillator are free to enter the input terminal T of the first binary stage 275 of the counter 13. In addition, lead 34 from the output inverter stage of the vertical sync stripper is connected to the emitter of transistor 310 and the counter output lead 22 is connected to the "reset" input 118 via a differentiating network comprising capacitor 330 and resistor 331.

The collector of transistor 310 is also connected to the input of counter inhibit stage 116. As described below, when the flip-flop is in the set state, output lead 49 of stage 116 is grounded so as to allow each of the counter flip-flop stages to operate.

The "reset" operation of the reset flip-flop is as follows: The positive pulse supplied on lead 22 from the output of inverter 294 is shown in the timing diagram of FIG. 5a at 125. The output of the differentiating circuit 121 comprises a first positive pulse corresponding to the leading edge of pulse 125 and a negative going pulse 128 corresponding to the trailing edge of the pulse 125. The positive pulse is blocked by diode 332 whereas the negative going pulse 128 is conducted therethrough to the base of transistor 310. Diode 332 and transistor 310 work in combination to inhibit reset of the flip-flop by pulse 128 when the stripped vertical pulse is present on lead 140. Thus, when the potential on lead 140 is at ground potential (no vertical sync pulse present), the negative pulse 128 at the base of transistor 310 will reset the reset flip-flop 115. As described above, this closes the inhibit gate 45 and disables the counter stage. However, if a stripped vertical sync pulse 125 is present as shown in FIG. 5 to produce a strobe pulse, the emitter of transistor 310 is negatively biased, thereby preventing this transistor from turning ON and thereby preventing reset of the flip-flop 115 by the pulse 128. Hence, if the negative pulse 128 corresponding to the trailing edge of the generated vertical pulse occurs at any time during the strobe interval, the flip-flop 115 cannot "reset" and instead remains in its "set" state to maintain inhibit gate 45 open and the counter stages of counter 13 in their enabled state. Since the strobe interval is defined by the stripped vertical pulses, the phase comparison between the output of the counter one-shot 291 and the stripped vertical pulse provides a phase check on the generated vertical pulses on lead 22 for inhibiting the counter division each time the output of the counter is out of phase with the strobe interval. This action, however, may be overridden by the video presence detector 15, as described below.

Counter inhibit stage 116.—The collector electrode of reset flip-flop transistor 310 is connected to the input of the counter inhibit stage 116 at the base of transistor 325. This transistor is connected as an emitter follower for driving transistor 301 ON when reset flip-flop 115 is in its "set" state (transistor 310 off and a negative potential applied to the base of transistor 325). As described above in connection with the counter 13, each binary stage of the counter is then enabled so as to divide by 525 the input pulses applied from the local oscillator 106. However, when the reset flip-flop 115 is in its "reset" state, emitter follower stage 325 drives transistor 301 OFF so as to disable each and every one of the binary counter stages.

Video presence detector 15.—The 15,750 c.p.s. output of the divide-by-two binary 110 on lead 24 is applied to the input of the video presence detector 15 (FIGS. 8a and 8b). A continuous chain of 15,750 c.p.s. positive pulses are thus applied to the base of transistor 340 which provides the input stage of the video presence detector. This stage inverts these pulses and provides a series of negative pulses at its collector which are clamped by diode 341 coupled to the collector via capacitor 342. The clamped pulses are in turn rectified by the diode 343 which forms a staircase generator in conjunction with capacitor 344. When the staircase generator is allowed to run, it will eventually charge up capacitor 344 until it reaches the intrinsic firing potential of the unijunction transistor 345. Capacitor 344 is allowed to charge up only when the stripped horizontal pulses are missing, i.e. when there is a blackout in sync information on the input video. Thus, when the stripped horizontal pulses are present at the collector of transistor 185, they cause the coupled emitter follower stage 360 (FIG. 8a) to turn ON. The collector and emitter of this stage are shunted across the capacitor 344 through ground and lead 33' so that this capacitor is discharged by each stripped horizontal pulse and thereby inhibiting the running of the staircase generator.

It will be apparent that the component values of this stage may be selected to detect a predetermined number of output pulses from the binary 110. In the exemplary embodiment herein described, the unijunction 345 is fired when some six to nine pulses are received on lead 24 in the absence of stripped horizontal sync. If a tighter phaselock was provided in the oscillator stage 12, the unijunction would normally be set to fire after receipt of fewer pulses on lead 24, and contrariwise, if a lower frequency bandwidth was provided for the stage 12, stage 15 would be set to require more pulses on lead 24.

When the unijunction 346 fires, a positive potential is applied to the base of transistor 347, resulting in transistors 347 and 348 turning ON and transistors 349 and 350 turning OFF. As a result, a positive potential is applied on lead 355 to the base of transistor 356, turning this transistor ON and applying a negative potential from source 357 through diode 358 and lead 361 to the "set" input 117 of the reset flip-flop 115. Accordingly, so long as the flip-flop 346 is in its "set" state, transistor 313 of the reset flip-flop is biased ON by this negative potential, preventing this latter flip-flop from being "reset" even though a pulse 128 from the counter 13 is applied to the base of flip-flop transistor 310. Thus, the video presence detector 15 overrides the divider control stage 14 when the requisite number of pulses are absent from the horizontal sync as detected by the staircase generator of the video presence detector.

The negative inhibit potential on lead 361 is cut off when the stripped horizontal sync pulses return in the following manner: The positive going stripped horizontal pulse at the collector of transistor 185 is connected via lead 33" and input resistance to the base of transistor 350 of flip-flop 346, turning this transistor ON and causing this flip-flop to revert to its "reset" state. The output of detector 15 then exercises no control over the divider control stage 14 and this state is maintained until the requisite number of successive stripped horizontal sync pulses are missing causing the unijunction 345 to again fire.

SYSTEM FOR MAGNETIC RECORDING INCLUDING THE SYNC GENERATOR

Referring to FIG. 9, there is shown a block diagram illustrating a system for recording and reproducing a broad frequency spectrum incorporating the sync generator described hereinabove. A transducing head 400 is carried on the periphery of a recording drum 401 driven by a direct current motor 402. The magnetic tape 403 is driven past the transducing head assembly by a supply capstan 404 and a take-up capstan 405. As exemplary embodiment of the transducing head assembly and capstan drive assembly is described and claimed in the co-pending application of Alexander R. Maxey entitled "Tape Recorder." Ser. No. 536,107, filed Mar. 21, 1966, now abandoned.

The video input on lead 410 is applied to a video record-reproduce stage 411 which includes suitable means for producing a modulated signal which is applied via lead 412 to the transducer head 400 for recording on the magnetic tape during the "record" operation. During the "playback" operation, a recorded signal on the magnetic tape 403 causes an output at the head 400 which is fed to stage 411 which further includes the necessary demodulator for reproducing the recorded signal and applying same to video output lead 413.

These respective "record" and "playback" operations are provided by a plurality of switches 417, 427, 431, 448, 452, 453 and 465 which are all shown in their "up" or "record" position. For "playback," the movable contacts of each of these switches are moved to their "down" or "playback" position.

Input lead 410 and output lead 413 of stage 411 are respectively connected to input leads 21 and 20 of switch 10 connected in the input of the sync generator 415. Sync generator stage 415 has been described in detail above and shown in FIGS. 1–8.

The locally generated vertical sync pulses on lead 22 are applied to the input of a variable delay one-shot multivibrator 416. This stage varies the phase position of the 60 c.p.s. vertical sync output of the sync generator to set the dropout at a predetermined position within the vertical blanking interval and thus avoid losing any of the picture content. As described hereinabove and illustrated in FIG. 6, this dropout occurs during the interval that the transducing head leaves the tape. The output of stage 416 is connected to a movable contact 417b of switch 418 which connects stage 416 to the reference inputs of phase detector stage 419 and frequency comparator stage 420 in the "record" operation and to the error inputs of these stages in the "reproduce" operation.

In "record," the error inputs of the phase detector and frequency comparator are connected to the output of amplifier 422 via movable switch contact 417c. Amplifier 422 receives an error signal from the drum which is taken from the photoelectric cell 423 and a light source (not shown) in alignment within the drum with an aperture of the drum so that a pulse is produced each time the aperture passes the photocell. This pulse is amplified in amplifier 422 to produce a pulse train having a frequency and phase corresponding to the rotational velocity and position of the head drum 401.

Phase detector 419 advantageously comprises a sample-and-hold stage wherein, for example, a sawtooth generator is synchronized to the reference input and periodically sampled by the error input. Assuming that the recording drum is correctly phased, a constant output signal will be provided at the output of the phase detector for driving the recording drum 401. If an out-of-phase condition is detected, a different portion of the sawtooth ramp will be sampled, providing a change in amplitude of the signal at the output of phase detector 419 for slowing or speeding up the drum to bring the error signal from the photocell pickoff 423 into phase correspondence with the generated vertical sync during the "record" operation.

Frequency comparator 420 detects a frequency difference between the generated vertical and the output of the pickoff 423 during the "record" operation for providing an analog signal at its output which is zero volts when the recording drum is being driven at the frequency of the generated vertical sync, a variable positive potential when the rotational velocity of the drum exceeds the reference frequency and a variable negative potential when the rotational velocity of the drum is less than the reference frequency.

The outputs of both the phase detector 419 and frequency comparator 420 are added in summer network 421, the output of which is amplified in amplifier 425 for energizing the D.C. motor 402 which drives the recording drum.

Accordingly, it will be seen that during the "record" operation, the drum motor is driven in accordance with an error signal derived by comparing the velocity and position of the recording drum with a locally generated jitter-free vertical sync derived at the output of the sync generator 415. The position of the video recorded sync pulses, as derived at the output of the sync generator 415, is modified by the variable delay one-shot multivibrator 416 to servo the velocity and position of the recording drum to maintain the dropout interval at any desired position of the vertical blanking interval.

During the "playback" operation, switches 10 and 418 are actuated so as to connect (i) the reproduced video to the input of the sync generator, (ii) a 60 cycle reference source on lead 430 to the reference inputs of the phase detector 419 and frequency comparator 420 via movable switch contact 417a, and (iii) the output of the one-shot multivibrator stage 416 to the error inputs of the phase detector and frequency comparator via movable contact 417b. Accordingly, it will be seen that during the "playback" mode, the recording drum 401 is driven in accordance with a signal derived by comparing a 60 cycle reference source with the locally generated jitter-free vertical sync pulses which are derived directly from the reproduced video. In this way, the recording drum is driven at that velocity which provides a video output on lead 13 whose composite sync is synchronized with the station reference. During "playback" then, the drum servo speeds up the motor 402 if the recording on the tape 403 was originally made at too slow a speed or slows down the motor 402 if the recording was originally made at too fast a speed.

During the "record" operation, the supply and take-up capstans 404, 405 are driven by the output of phase comparator 424 having its reference input connected to a 60 cycle reference via movable contact 426 of switch 427 and its error input connected to a signal corresponding to the position and velocity of the take-up capstan 405, this signal being derived from the output of photocell 428 through amplifier 429 and movable contact 430 of switch 431. The output of the phase comparator is connected to the respective motor drive amplifiers 435, 436 through respective summing networks 437, 438. The outputs of amplifiers 435, 436 are respectively connected to the inputs of the capstan drive D.C. motors 439 and 440 respectively. Phase comparator 424 supplies a predetermined value command signal for driving the capstan motors 439, 440 at the required rotational velocity as fixed by the reference source connected to switch 427. If the take-up capstan should slow up for any reason, this is detected by photocell 428 which applies an error signal through switch 431 to bring the capstans up to the velocity set by the reference frequency. A speed-up of the capstans during "record" is similarly corrected. Accordingly, this servo loop synchronizes the speed of the tape drive capstan assembly with a command signal derived from the station reference sync applied to the movable switch contact 426 during the "record" operation.

Further, during the "record" operation, a signal corresponding to the velocity and position of the recording drum is recorded on a control track of the magnetic tape 403 via amplifier 445 and control track transducer head 446 via the movable contact 447 of switch 448 which is connected to the output of amplifier 445.

During the "playback" operation, the reference input of the phase comparator 424 is connected to the output of amplifier 422, i.e. to the signal corresponding to the velocity and position of the record drum. The error input of the phase comparator 424 is connected to the reproduced control track via switch 448, amplifier 455 and one-shot multivibrator 456. Accordingly, the capstan motors 439 and 440 are servo driven to properly position the video tracks on tape 403 in relation to the position of the drum 401. Variable delay one-shot multivibrator 456 allows the position of the pulses produced by the control track head to be changed. In this manner, the tape being reproduced can be positioned in correct registration with the head 400 at the beginning of the tape "playback" to compensate, for example, for a difference in physical spacing between the head and control track head on the machine which originally made the recording and the machine on which the tape is being reproduced.

In accordance with the invention of Alexander R. Maxey disclosed and claimed in the application entitled "Dual Capstan Control System," Ser. No. 537,222 filed Mar. 24, 1966, now abandoned, the supply capstans 404 and 405 are differentially controlled during the "playback" operation. As shown, the control signal for this differential control is advantageously obtained from a system including output lead 23 of sync generator 415, sample-and-hold circuit 460 and differential amplifier 461. Lead 23 is connected to the input of sample-and-hold stage 460 through the movable contact 466 of switch 465 which is closed only during the "playback" operation. The pulsed signal at the output of amplifier 422 (indicating the rate and position of the drum) is also connected to the sample-and-hold stage 460 through movable contact 467 of switch 465 and variable one-shot multivibrator 468. The sample-an-hold stage advantageously includes means for charging up a capacitor to the signal on lead 23 during a sampling interval defined by one-shot 468. The output of the sample-and-hold 460 is passed through a servo compensating filter 469 to the input of differential amplifier 461. The differential outputs 470 and 471 of this amplifier are respectively applied to the summer networks 437 and 438 to apply a differential correction voltage according to the sampled signal from lead 23.

The differential control is used to compensate for differences in the length of the tape 403 caused, for example, by changes in stretch from recorder to recorder, changed humidity conditions, changed temperature conditions, etc. If the tape is longer or shorter than standard, head 400 will leave the tape and come back on to the tape in a slightly different position of alignment, i.e. the longitudinal dimension of the tape may be slightly contracted or stretched whereas the physical circumferential dimension of the drum remains constant. Any such misalignment will show up in the closed loop, phase-locked oscillator portion of the sync generator, since the stripped horizontal pulses at the initiation of each new trace following dropout will then be slightly out-of-phase with the stripped horizontal pulses of the immediately succeeding trace. As described hereinabove, the control signal on lead 23 is provided by sampling a positive ramp with the stripped horizontal pulses on 33. A change in phase such that the pulses of the new frame lead those of the previous frame (as caused by a contracted tape) will result in the ramp being sampled earlier in the sampling interval, thus producing a negative control signal on lead 23 to bring the local oscillator into phase with the stripped horizontal sync waveform, whereas, if the pulses of the new frame lag those of the immediately preceding frame (as caused by a stretched tape), the ramp is sampled later in the sampling interval, thus producing a positive control signal on lead 23.

The signal on lead 23 is sampled after each dropout interval (the timing of the sampling interval being set by one-shot 468) in the sample-and-hold stage 460 for applying a differential control on the capstans. Thus, a tape slightly longer than standard produces a positive signal on 23, resulting in a positive signal at the input of differential amplifier 461 and respective positive and negative signals of equal magnitude on leads 470 and 471. A slightly larger torque is then supplied to capstan 404 than to take-up capstan 405 resulting in a relaxation and contraction of the tape which is too long. Similarly, a tape which is too short will produce respective negative and positive signals of equal magnitude on leads 470 and 471 to give take-up capstan 405 more torque than supply capstan and thereby cause the tape to be stretched during the "playback" operation to conform to the machine dimensions.

I claim:
1. In a sync generator for generating a steady, jitter-free vertical sync pulse train from an input video signal which includes horizontal and vertical sync pulses,
   variable oscillator means for producing an output frequency equivalent to a whole integer multiple of both the horizontal and vertical sync rates of said input video signal,
   means for stripping said horizontal and vertical sync pulses from said input video signal,
   means operatively coupled to said variable oscillator means for phase-locking said oscillator means to the stripped horizontal sync pulses,
   divider means for digitally dividing the output frequency of said variable oscillator for generating a pulse train at the vertical sync rate, said divider means including a digital counter whose counting cycle is initiated in response to respective ones of said stripped vertical sync pulses, each pulse of said pulse train occurring at the end of a respective counting cycle, and
   control means operatively coupled to said divider means and responsive to the output of said divider means and said stripped vertical sync pulses for comparing the phase of said generated vertical sync pulses with the phase of said stripped vertical sync pulses, said control means (i) tolerating a predetermined magnitude of phase shift of said stripped vertical sync pulses relative to said generated vertical syn pulses to allow for the effects of jitter on the stripped vertical waveform and (ii) terminating a counting cycle when the phase difference between the stripped and generated vertical sync pulses is greater than that tolerated.

2. In a sync generator for generating a steady, jitter-free vertical sync pulse train from an input video signal which includes horizontal and vertical sync pulses,
  variable oscillator means for producing an output frequency equivalent to a whole integer multiple of both the horizontal and vertical sync rates of said input video signal,
  means for stripping said horizontal and vertical sync pulses from said input video signal,
  means operatively coupled to said variable oscillator means for phase-locking said oscillator means to the stripped horizontal sync pulses,
  divider means for digitally dividing the output frequency of said variable oscillator for generating a pulse train at the vertical sync rate,
  control means operatively coupled to said divider means and responsive to the output of said divider means and said stripped vertical sync pulses for comparing the phase of said generated vertical sync pulses with the phase of said stripped vertical sync pulses, said control means (i) tolerating a predetermined magnitude of phase shift of said stripped vertical sync pulses relative to said generated vertical sync pulses to allow for the effects of jitter on the stripped vertical waveform and (ii) inhibiting said digital division when the phase difference between the stripped and generated vertical sync pulses is greater than that tolerated, and
  means operatively coupled to said control means and responsive to said stripped horizontal sync pulses for preventing said control means from inhibiting said digital division whenever a predetermined amount of horizontal sync pulses are missing from the input video signal.

3. In a sync generator for generating a steady, jitter-free vertical sync pulse train from an input video signal,
  first means for producing a continuous waveform having a frequency equivalent to a whole integer multiple of both the horizontal and vertical sync pulse rates,
  second, cyclically operable, means for digitally dividing the output frequency of said first means by a constant factor to generate a train of vertical sync waveforms,
  third means responsive to the vertical sync waveform of said input video signal to produce stripped vertical sync waveforms, and
  fourth means for terminating at least one cycle of said second means in response to both a phase lead and a phase lag between the outputs of said second and third means in excess of an accurately established, predetermined time limit.

4. In the sync generator of claim 3,
  means operatively connecting said fourth means to said second means for initiating digital division of the output of said first means in synchronization with the stripped vertical sync waveform.

5. In the sync generator of claim 3,
  means responsive to said fourth means for interrupting the signal path between said first means and said second means when the phase shift of said stripped vertical sync waveform relative to said generated vertical sync waveform is larger than said predetermined limit.

6. The sync generator of claim 5 wherein a signal path between said first means and said second means is re-established following said interruption simultaneously with the occurrence of the next succeeding stripped vertical sync waveform.

7. In the sync generator of claim 3, means for obtaining the vertical sync pulses from said input video signal including a gate for selectively providing a conductive path for the composite sync of said input video signal and means for closing said gate following receipt of a vertical sync pulse from the input video in response to said vertical sync waveform and opening said gate a predetermined time thereafter.

8. In the sync generator of claim 3 wherein said input video signal includes a signal dropout during the vertical blanking interval,
  gate means for receiving the vertical sync waveform of said input video signal,
  integrator means coupled to the output of said gate means for separating the vertical sync waveform from said input video signal, and
  gate control means responsive to the output of said integrator means and operatively connected to said gate means, said gate control means being triggered upon a vertical sync waveform at the output of said integrator for closing said gate means during a predetermined period of time which includes said dropout interval so that said integrator is not erroneously effected by said signal dropout.

9. In the sync generator of claim 3,
  means for producing a strobe interval of predetermined length corresponding in phase with the vertical sync waveform of said input video signal,
  said fourth means being responsive to said strobe interval for determining whether a predetermined portion of the generated sync waveform falls within said strobe interval.

10. The sync generator of claim 9 wherein
  said means for producing said strobe interval includes means responsively connected to the vertical sync waveform and being triggered for a predetermined time interval corresponding to said strobe interval.

11. The sync generator of claim 9 wherein
  said fourth means includes a bi-stable element which is triggered to the first of its stable states by the strobe interval and triggered to the second of its stable states by the generated vertical sync waveform output of said second means,
  means connecting said bi-stable element to said second means so that second means is enabled in the first stable state of said bi-stable element and inhibited in the second stable state of said bi-stable element.

12. In the sync generator of claim 11,
  first differentiating means connected between said third means and said bi-stable element so that said bi-stable element is set to the first of its first stable states by the leading edge of the vertical sync waveform of said input video signal, and
  second differentiating means connected between said second means and said bi-stable means so that said bi-stable element is triggered to the second of its stable states by the trailing edge of said generated vertical sync waveform.

13. In the sync generator of claim 11,
  means for detecting whenever a predetermined amount of horizontal sync waveform is missing from the input video waveform, said means being operatively coupled to said bi-stable means so that said bi-stable means is retained in the first of its stable states when a predetermined amount of horizontal sync waveform is missing from the input video signal so that said second means remains enabled.

14. In the sync generator of claim 3,
  means for detecting whenever a predetermined amount of horizontal sync waveform is missing from the input video waveform, said means being operatively connected to said fourth means so that said digital division is not suspended by said fourth means when a predetermined amount of horizontal sync waveform is missing from the input video signal.

15. The sync generator of claim 14 wherein
  said means for detecting whenever a predetermined amount of horizontal sync waveform is missing from the input video waveform includes
  a storage means,
  means for dividing the output of said first means for producing a continuous waveform having the repetition frequency of said horizontal sync rate, means connecting the output waveform of said last mentioned means to said storage means so that a predetermined signal magnitude is stored for each cycle of said waveform, means responsive to a predetermined magnitude of signal stored in said storage means and providing a control signal to said fourth means to prevent the inhibiting of digital division by said fourth means, and means coupling said storage means to the horizontal sync waveform of said input video waveform for discharging said storage means for each cycle of horizontal sync waveform present on said input video waveform.

16. In the sync generator of claim 15, a bi-stable means coupled to said magnitude responsive means for applying a continuous control signal to said fourth means, and means responsive to said input video waveform for triggering said bi-stable element to its opposite stable state and removing said control signal when the horizontal sync waveform on the input video is re-established.

17. A video presence detector for comparing the horizontal sync pulses which are stripped from an input video signal with a locally generated pulse train whose repetition frequency is equivalent to the horizontal rate and providing an output control signal when a predetermined number of stripped horizontal pulses are missing comprising a capacitor, means responsive to the locally generated horizontal pulse train for successively applying a predetermined magnitude of charge to said capacitor during each horizontal period, means responsive to the stripped horizontal sync pulses for discharging said capacitor, means coupled to said capacitor having a predetermined firing potential corresponding to a predetermined charge on said capacitor, and means responsive to said last named means for generating said output control signal when said means reaches its predetermined firing potential.

18. A vertical sync stripper for stripping vertical sync pulses from the composite sync waveform which is insensitive to signal dropout during the vertical blanking interval comprising gate means in series with the composite sync waveform, integrator means connected at the output of said gate means for stripping the vertical sync pulses from said composite waveform, and gate control means connected between the output of said integrator means and an input of said gate means for interrupting the signal path to said integrator means in response to a vertical sync waveform for a period which includes the dropout interval following receipt of said vertical sync waveform.

19. In a sync generator for generating a steady, jitter-free vertical sync pulse corresponding in phase and frequency to the vertical sync waveform of an input video signal when the composite sync waveform is present on the input video signal and which continues to generate said vertical sync pulse train during the intervals that the composite sync waveform is missing from said input video signal, variable oscillator means responsive to a control signal for producing an output frequency equivalent to a whole integer multiple of both the horizontal and vertical sync rates of said input video signal for a zero control signal and an increased or decreased frequency corresponding to said control signal, frequency divider means coupled to the output of said variable oscillator means for producing an output frequency equivalent to the horizontal sync pulses, sync separation means for deriving horizontal and vertical sync pulses from said input video signal, means for producing said control signal as a function of the relative phases of said derived horizontal sync pulses and the output of said frequency divider means and further characterized by said control signal going to zero during the absence of horizontal sync pulses from said input video signal, and means for digitally dividing the output of said variable oscillator for producing said steady jitter-free vertical sync pulse train.

20. In a system for recording and reproducing a video signal which includes horizontal and vertical sync pulses, rotational transducing head means for recording and reproducing a signal on a recording media, means for stripping said horizontal and vertical sync pulses from said input video signal, servo means for synchronizing the rotational velocity and position of said transducing head means with the vertical sync of said input video signal while eliminating errors caused by jitter of the separated vertical sync pulses including variable oscillator means for producing an output frequency equivalent to a whole integer multiple of both the horizontal and vertical sync rates of said input video signal, means operatively coupled to said variable oscillator means and responsive to said stripped horizontal sync pulses and the output of said variable oscillator means for phase-locking said oscillator means to the stripped horizontal sync pulses, divider means for digitally dividing the output frequency of said variable oscillator for generating a steady, jitter-free pulse train having a repetition frequency equivalent to the vertical pulses of said input video signal control means, control means operatively coupled to said divider means and responsive to the output of said divider means and said stripped vertical sync pulses for comparing the phase of said generated vertical sync pulses with the phase of said stripped vertical sync pulses, said control means (i) tolerating a predetermined magnitude of phase shift of said stripped vertical sync pulses relative to said generated vertical sync pulses to allow for the effects of jitter on the stripped vertical waveform and (ii) inhibiting said digital division when the phase difference between the stripped and generated vertical sync pulses is greater than that tolerated, means for generating a signal corresponding to the rate and position of said transducing head means, means for comparing the generated jitter-free vertical pulse train with the signal corresponding to the rate and position of said transducing head means for producing an error control signal, and means responsive to said error control signal for rotatably driving said transducing head means.

21. In a system for recording and reproducing a video signal which includes horizontal and vertical sync pulses, rotational transducing head means for recording and reproducing a signal on a recording media, means for stripping said horizontal and vertical sync pulses from said input video signal, servo means for synchronizing the rotational velocity and position of said transducing head means with a steady, jitter-free pulse train generated in phase correspondence with said stripped vertical sync and maintained during periods when the composite sync is missing from said input video signal by the "flywheel" action of a local oscillator, said servo means including
- oscillator means for producing a continuous waveform having a frequency equivalent to a whole integer multiple of the horizontal and vertical sync pulses,
- digital divider means responsive to said oscillator means for generating a steady, jitter-free pulse train having a repetition frequency equivalent to the vertical pulses of said input video signal,
- control means operatively coupled to said divider means and responsive to the output of said divider means and said stripped vertical sync pulses for comparing the phase of said generated vertical sync pulses with the phase of said stripped vertical sync pulses, said control means (i) tolerating a predetermined magnitude of phase shift of said stripped vertical sync pulses relative to said generated vertical sync pulses to allow for the effects of jitter on the stripped vertical waveform and (ii) inhibiting said digital division when the phase difference between the stripped and generated vertical sync pulses is greater than that tolerated,
- means operatively coupled to said control means and responsive to the composite sync of said input video signal for preventing said control means from inhibiting said digital divider whenever said composite sync is missing from the input video signal,
- means for generating a signal corresponding to the rate and position of said transducing head means,
- means for comparing the generated jitter-free vertical pulse train with the signal corresponding to the rate and position of said transducing head means for producing an error control signal, and
- means responsive to said error control signal for rotatably driving said transducing head means.

22. In a system for recording and reproducing a video signal which includes horizontal and vertical sync pulses, a rotational transducing head for recording a signal on a recording media, said head periodically leaving the recording media for a predetermined dropout period, servo means for synchronizing the rotational velocity and position of said transducing head means with the vertical sync of said input video signal while eliminating errors caused by jitter of the separated vertical sync pulses including
- oscillator means for producing a continuous waveform having a frequency equivalent to a whole integer multiple of the horizontal and vertical sync pulses,
- means responsive to said oscillator means for generating a steady, jitter-free pulse train having a repetition frequency equivalent to the vertical pulses of said input video signal, and
- means responsive to said steady, jitter-free pulse train for varying the phase position of said pulse train to set said dropout period at a predetermined position within the vertical blanking interval.

23. In a system for recording and reproducing a broad frequency spectrum signal having first and second types of sync pulses, said first pulse having a repetition rate substantially higher than the repetition rate of said second pulses with a predetermined number of said first sync pulses being spaced between respective ones of said second sync pulses,
- rotatable transducing head means for recording and reproducing a signal on a recording medium,
- means for synchronizing the rotational velocity and position of said transducing head means with the sync information of said broad frequency spectrum signal including
    - means for separating out the sync information of said broad frequency spectrum signal,
    - oscillator means phase-locked to the first sync pulses of said separated sync information for producing a continuous waveform having a frequency equivalent to a whole integer multiple of both the first and second types of sync pulses,
    - digital divider means responsive to said oscillator means for generating a steady, jitter-free pulse train having a repetition frequency equivalent to said second pulses,
    - means operatively coupled to said digital divider means for comparing the phase of said generated jitter-free pulse train with the second pulses of said separated sync information to maintain phase correspondence between said generated jitter-free pulse train and the second pulses of said separated sync information, and
    - means responsive to said steady, jitter-free pulse train for driving said transducing head means.

References Cited

UNITED STATES PATENTS

| | | |
|---|---|---|
| 2,519,911 | 8/1950 | Kuperus. |
| 3,217,102 | 11/1965 | Taylor. |
| 2,593,450 | 4/1952 | Hester. |
| 2,704,307 | 3/1955 | Gillette. |
| 2,712,570 | 7/1955 | Van de Polder. |
| 2,752,424 | 6/1956 | Pugsley. |
| 2,944,108 | 7/1960 | Houghton. |
| 3,112,364 | 11/1963 | Myles. |
| 3,175,034 | 3/1965 | Kihara. |
| 3,336,440 | 8/1967 | Blake. |
| 3,379,828 | 4/1968 | Smith. |
| 3,415,948 | 12/1968 | Townsend. |

RICHARD MURRAY, Primary Examiner

J. A. ORSINO, JR., Assistant Examiner

U.S. Cl. X.R.

178—6.6, 7.5